United States Patent Office 2,905,684
Patented Sept. 22, 1959

2,905,684
WERNER COMPLEXES OF 4-ACETYL-PYRIDINE

William D. Schaeffer, Pomona, and William Smith Dorsey, Fullerton, Calif., assignors to Union Oil Company of California, Los Angeles, Calif., a corporation of California No Drawing. Application April 29, 1957
Serial No. 655,541

5 Claims. (Cl. 260—270)

This invention relates to certain new Werner complexes which are found to exhibit the unusual property, unique insofar as we are aware, of selectively absorbing, or "clathrating," ethylbenzene into their crystal structure in strong preference to the other xylene isomers. They may hence be employed for separating ethylbenzene from mixtures containing any one or more of the other C-8 aromatic isomers.

The new complexes consist of certain metal thiocyanates coordinated with substantially four moles of 4-acetyl-pyridine. They may be designated by the following general formula:

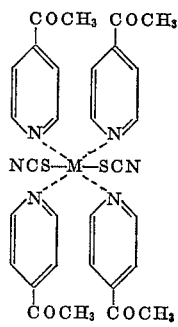

wherein M is a metal of atomic number 25 to 28 (i.e. manganese, iron, cobalt or nickel).

When any of the above complexes are triturated with, or precipitated in the presence of, a liquid mixture of isomeric xylenes, it is found that the ethylbenzene is selectively integrated into the crystal structure, forming what is presently regarded as a "clathrate." The other isomers, i.e. p-xylene, m-xylene and o-xylene, are strongly rejected from the clathrate. The solid clathrate may then be separated from the liquid phase, and decomposed with acid or heat to recover the ethylbenzene concentrate.

The corresponding Werner complexes of other nitrogen bases, e.g. 3-cyano pyridine, nicotinamide, isonicotinamide, ethyl isoniconate, 4-methyl pyridine, and 4-ethylpyridine, do not clathrate ethylbenzene in preference to p-xylene, the p-xylene being selectively clathrated in preference to all the other isomers. However, some ethylbenzene is also clathrated, and several clathration stages are necessary to obtain complete separation of p-xylene from ethylbenzene. By using the 4-acetyl-pyridine complexes of this invention to remove ethylbenzene from the feed to, or an extract from, a p-xylene clathration process, the number of stages necessary to obtain complete resolution of p-xylene and ethylbenzene is considerably reduced.

The new complexes may be easily prepared by simply admixing the proper mole-ratios of metal thiocyanate (one mole), and the pyridine base (four moles or more), normally at room temperatures, although higher or lower temperatures may be employed. If desired the metal thiocyanate may be first dissolved in a solvent such as water containing excess thiocyanate ions, e.g. KSCN, and the complex precipitated by addition of the 4-acetyl-pyridine. The complexes are substantially insoluble in water, and soluble in chloroform and methyl cellosolve.

When working in aqueous solutions, it is not necessary to start with pure metal thiocyanates. Any soluble salt which forms a more soluble complex with the 4-acetyl-pyridine than does the thiocyanate may be initially dissolved in the solvent; thiocyanate ions are then added, and finally the 4-acetyl-pyridine, whereupon the less soluble thiocyanate complex is selectively precipitated in accordance with the laws of mass action. The complexes of the metal halides are much more soluble in water than the corresponding thiocyanates, and hence it is convenient to use solutions of metal chlorides or bromides as starting materials, first adding thereto an excess of alkali metal thiocyanate, e.g. NaSCN, KSCN, NH$_4$SCN, etc., then adding the 4-acetyl-pyridine. The resulting precipitate is then recovered by filtration, washed with water, or other appropriate solvent, and dried at low temperatures, e.g. 25°–100° C. Higher temperatures are likely to cause decomposition.

A suitable method of preparation is illustrated in the following example:

EXAMPLE I

About 6 grams (0.05 mole) of 4-acetyl-pyridine was dissolved in 5 ml. of water. Another solution was prepared containing 2.98 grams (0.0125 mole) of nickel chloride (NiCl$_2$.6H$_2$O) and 2.05 grams (0.025 mole) of sodium thiocyanate dissolved in 15 ml. of water. The two solutions were then mixed and stirred, whereupon a blue precipitate formed. The precipitate was filtered off, washed several times with water, and air dried overnight. A pale blue solid was obtained in 91% yield, melting at 289° C. Elemental analysis was as follows:

|  | C | H | S | Ni |
|---|---|---|---|---|
| Calculated | 54.6 | 4.3 | 9.72 | 8.9 |
| Found | 56.1 | 4.45 | 9.9 | 8.05 |

The product was hence nickel tetra (4-acetyl-pyridine) dithiocyanate.

By substituting mole-equivalent proportions of manmangese, iron or cobalt chlorides for nickel chloride in the above example, the corresponding Werner complexes of those metals are obtained in similar yields and purities. The resulting complexes are:

| Complex | Physical appearance |
|---|---|
| (1) Manganous tetra-(4-acetyl-pyridine) dithiocyanate. | White solid. |
| (2) Ferrous tetra-(4-acetyl-pyridine) dithiocyanate | Tan solid. |
| (3) Cobalt tetra-(4-acetyl-pyridine) dithiocyanate | Pink solid. |

All of the above complexes exhibit selective clathrating properties for ethylbenzene, similar to that shown in the following example:

EXAMPLE II

Two grams of the complex prepared in Example I were dissolved with heating in 30 ml. of methyl cellosolve, along with 2 drops of excess 4-acetyl-pyridine. Twenty ml. of mixed xylene and 15 ml. of iso-octane were then added, and the solution was evaporated to dryness in an air stream at room temperature. The remaining solid was recovered and washed with 10 ml. of iso-octane. The washed solid was then dissolved in 10 ml. of dilute (50/50) HCl, and the hydrocarbon phase was extracted with 20 ml. of iso-octane. The hydrocarbon extract was then washed three times with water and dried over Na$_2$SO$_4$. Ultra violet spectranalysis of the hydrocarbon phase, and of the original xylene mixture, showed that the isomer distribution was as follows:

Table 1

| | Volume Percent | | | |
|---|---|---|---|---|
| | p-Xylene | m-Xylene | o-Xylene | Ethylbenzene |
| Feed | 19.9 | 45.5 | 19.3 | 15.3 |
| Hydrocarbon from clathrate | 11.5 | 23.5 | 10.4 | 54.6 |

It is apparent that the complex exhibits a strong tendency to clathrate ethylbenzene, and strongly rejects each of the other isomers. It may hence be used for removing ethylbenzene from o-xylene, m-xylene, or p-xylene, or mixtures thereof, or for recovering pure ethylbenzene from such mixtures.

In addition to their use as clathrate-formers, the complexes are also useful in other fields as e.g. insecticides, oil-soluble metal carriers, oxidation accelerators for paints and the like. Their solubility in many organic solvents, e.g. aromatic hydrocarbons, renders them useful as impregnants for intimately depositing catalytic metals on hydrophobic surfaces as e.g. activated carbon and the like. Other uses will be apparent to those skilled in the art.

This application is a continuation-in-part of our prior application Serial No. 466,939, filed November 4, 1954.

Other specific complexes, methods of preparation and uses will readily occur to those skilled in the art. The true scope of the invention is intended to be embraced by the following claims:

We claim:
1. A Werner complex having the formula:

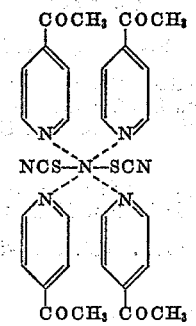

wherein M is metal of atomic number 25 to 28 inclusive.
2. Nickel tetra(4-acetyl-pyridine) dithiocyanate.
3. Cobalt tetra (4-acetyl-pyridine) dithiocyanate.
4. Manganese tetra(4-acetyl-pyridine) dithiocyanate.
5. Ferrous tetra(4-acetyl-pyridine) dithiocyanate.

References Cited in the file of this patent
UNITED STATES PATENTS

| 2,774,802 | Christian | Dec. 18, 1956 |
| 2,798,891 | Schaefer | July 9, 1957 |

UNITED STATES PATENT OFFICE
CERTIFICATE OF CORRECTION

Patent No. 2,905,684 September 22, 1959

William D. Schaeffer et al.

It is hereby certified that error appears in the printed specification of the above numbered patent requiring correction and that the said Letters Patent should read as corrected below.

Column 2, lines 45 and 46, for "man-mangese" read -- manganese --; column 4, line 14, claim 1, in the chemical formula, centermost symbol, for "N" read -- M --.

Signed and sealed this 15th day of March 1960.

(SEAL)
Attest:

KARL H. AXLINE
Attesting Officer

ROBERT C. WATSON
Commissioner of Patents